(12) United States Patent
Soltis et al.

(10) Patent No.: US 7,680,990 B2
(45) Date of Patent: Mar. 16, 2010

(54) SUPERWORD MEMORY-ACCESS INSTRUCTIONS FOR DATA PROCESSOR

(75) Inventors: Donald C. Soltis, Fort Collins, CO (US); Dale C. Morris, Steamboat Springs, CO (US); Dean Ahmad Mulla, Saratoga, CA (US); Achmed Rumi Zahir, Menlo Park, CA (US); Amy Lynn O'Donnell, Ann Arbor, MI (US); Allan Douglas Knies, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 10/449,442

(22) Filed: May 30, 2003

(65) Prior Publication Data

US 2004/0243790 A1 Dec. 2, 2004

(51) Int. Cl.
*G06F 12/00* (2006.01)
*G06F 13/00* (2006.01)
*G06F 13/28* (2006.01)

(52) U.S. Cl. ...................................... 711/154
(58) Field of Classification Search ................ 712/225; 711/154
See application file for complete search history.

(56) References Cited

U.S. PATENT DOCUMENTS

| | | | | |
|---|---|---|---|---|
| 3,793,631 A * | 2/1974 | Silverstein et al. | ........... | 712/233 |
| 4,293,941 A * | 10/1981 | Muraoka et al. | ............ | 711/109 |
| 4,334,269 A * | 6/1982 | Shibasaki et al. | ........... | 712/202 |
| 4,714,994 A * | 12/1987 | Oklobdzija et al. | ......... | 712/207 |
| 4,760,545 A * | 7/1988 | Inagami et al. | .................. | 712/4 |
| 5,001,626 A * | 3/1991 | Kashiyama et al. | ............ | 712/4 |
| 5,001,629 A * | 3/1991 | Murakami et al. | .......... | 712/202 |
| 5,115,506 A * | 5/1992 | Cohen et al. | ................. | 710/267 |
| 5,274,792 A * | 12/1993 | Sato | ........................... | 711/168 |
| 5,452,101 A * | 9/1995 | Keith | ......................... | 382/234 |
| 5,491,826 A * | 2/1996 | Koino | ........................... | 711/5 |
| 5,530,817 A * | 6/1996 | Masubuchi | ................... | 712/24 |
| 5,634,046 A * | 5/1997 | Chatterjee et al. | ........... | 712/227 |
| 5,708,800 A * | 1/1998 | Tateishi et al. | .............. | 345/563 |
| 5,889,983 A * | 3/1999 | Mittal et al. | ................. | 712/223 |
| 5,935,240 A * | 8/1999 | Mennemeier et al. | ....... | 712/225 |
| 6,275,925 B1 * | 8/2001 | Matsumoto et al. | ......... | 712/208 |
| 6,456,891 B1 * | 9/2002 | Kranich et al. | ................. | 700/2 |
| 6,460,121 B1 * | 10/2002 | Bonola | ....................... | 711/154 |
| 6,502,170 B2 * | 12/2002 | Zahir | ......................... | 711/141 |
| 6,725,355 B1 * | 4/2004 | Imamura | ..................... | 712/36 |
| 6,745,320 B1 * | 6/2004 | Mitsuishi | .................... | 712/225 |
| RE38,679 E * | 12/2004 | Matsuo et al. | .............. | 712/212 |
| 6,877,084 B1 * | 4/2005 | Christie | ...................... | 712/203 |
| 6,922,666 B2 * | 7/2005 | Noyes | .......................... | 703/26 |

* cited by examiner

*Primary Examiner*—Sheng-Jen Tsai

(57) ABSTRACT

Atomic sixteen-byte memory accesses are provided in a 64-bit system in which eight of the bytes are stored in a 64-bit general-purpose register and eight of the bytes are stored in a 64-bit special-purpose register. A 16-byte load instruction transfers the low eight bytes to an explicitly specified general-purpose register, while the high eight bytes are transferred to the special-purpose register. Likewise, a 16-byte store instruction transfers data from a general-purpose register and the special-purpose register. Also provided is an 8-byte compare conditioning a 16-byte exchange semaphore instruction that can be used to accelerate algorithms that use multiple processors to simultaneously read and update large databases.

13 Claims, 1 Drawing Sheet

SUPERWORD MEMORY-ACCESS INSTRUCTIONS FOR DATA PROCESSOR

BACKGROUND OF THE INVENTION

The present invention relates to data processing and, more particularly, data processing involving load and store operations. A major objective of the invention is to provide for improved implementation of superword-size atomic load and store operations in a multiprocessor environment.

Much of modern progress is associated with advances in computer technology. Generally, computers have one or more data processors and memory. Each data processor fetches instructions from memory and manipulates data, typically stored in memory, in accordance with the instructions. While a processor typically treats instructions distinct from data, instructions can be manipulated as data in accordance with other instructions.

A typical data processor includes a general-purpose register file that provides for temporary holding of data loaded from memory, data calculated by the processor, and data to be stored in memory. The general-register file typically includes a number of registers having a common bit width. The common register bit width defines the word size, the largest amount of data typically transferable with one instruction. Early processors had 8-bit registers, but 64-bit registers are presently typical.

In addition to general-purpose registers, some processors have special-purpose registers. For example, the Intel® Itanium® architecture provides a set of application registers including an "ar.csd" register used to ensure compatibility with previous generation 32-bit processors. Additionally, the Intel Itanium architecture provides an ar.ccv register that is typically used to store values for comparison. For example, this register is used by a word-size (eight-byte) compare and exchange semaphore instruction (cmpxchg8). When this instruction is executed, a word at an explicitly specified memory location is transferred to a specified general-purpose register. The transferred value is then compared with the value in the ar.ccv register. If the values are equal, a value from another specified general register is stored to the same specified memory address. "Semaphore" refers to a key that grants exclusive access to a section of memory to a processor that holds it. Thus, the semaphore operations are performed atomically; that is, they are done as a single memory operation, and no other memory operations can occur in the middle.

Computer processors typically implement memory operations that transfer data between memory and processor with a transfer size equal to or smaller than the size of the processor registers. For example, most modern 64-bit RISC ("reduced instruction set computers") processors can load and store information from and to memory in units of 64 bits, 32 bits, 16 bits, or 8 bits.

There are performance advantages to providing for superword-size (typically double-word, but generally, anything greater than one word) transfers as well. Modern processors typically provide a wider data path to a level-1 cache than the word-width data path normally provided to the general-purpose registers. For example, a 64-bit processor can have a 128-bit (16-byte) data path to the level-1 cache. For word-size transfers, 64 bits of the level-1 cache data path are selected for transfer. Providing a way to transfer all 128 bits available on the level-1 cache data path into the processor registers can increase the maximum cache to register bandwidth, which can, in turn, increase overall performance in some processors.

There are further advantages to superword transfers in the context of multiprocessor systems in which multiple processors may be attempting to read from and write to the same region of memory. For example, in the Intel Itanium architecture, the basic unit of program instruction is the "bundle" which is 128 bits in size and holds three instructions. A program running on one processor may attempt to modify a bundle in memory, while, at the same time, another processor may attempt to execute that same bundle. The writing processor acts to ensure that, if the executing processor fetches the bundle, it will fetch either the entire old (umodified) bundle, or the entire newly written bundle, and not a combination of 64 old bits and 64 new bits.

In other words, there is a need for "atomic" multiword transfers. In an "atomic" transfer, the entire access is done as a single inseparable unit, as opposed to multiple, distinct accesses. In practical terms, storing a quantity atomically means that another processor that may be reading the same memory simultaneously sees either all the bytes being stored or none of them, depending upon whether their load of that memory happens to occur after or before the store. Similarly, loading a quantity atomically means that all of the bytes being read are read with no intervening stores by other processors.

If only word-sized transfers are permitted, two load instructions are required to read a bundle. To ensure consistency, some sort of memory locking mechanism must be implemented, either in hardware or software, during the read or the write so that the two loads result in consistent data. Unfortunately, such locking mechanisms can be very complex to implement and can cause performance scalability problems as the number of processors in a system increases.

Prior systems have permitted single-instruction superword memory accesses, thus reducing the need for complex blocking mechanisms. For example, the transfer can be between memory and a pair of general-purpose registers. However, such transfers typically require additional read and write ports to the general-purpose register file. Such extra ports are costly to implement and adversely impact instruction cycle time (and thus performance). It is generally a poor tradeoff to add such read or write ports unless they will be used by a large percentage of instructions.

Additionally, the two general-purpose registers must be somehow specified. Due to instruction encoding space constraints, it is generally not possible to specify an additional register in a single instruction. Alternatively, the additional register can be implicitly specified—e.g., it can be a register adjacent to the one that is specified. However, implied general-register sources or targets create complexity for the software, e.g., exception handling software, which must then manage the registers as pairs in situations where the larger operations are used. Accordingly, there remains a need for a system that can efficiently perform superword memory accesses atomically.

SUMMARY OF THE INVENTION

The present invention provides for superword memory-access transfers in which the data being transferred is divided between a general-purpose register and a special-purpose register. For example, a 128-bit (16-byte) load transfers a less-significant 64-bit (8-byte) word to an explicitly specified general-purpose register and a more significant 8-byte word to a special purpose register that is implicitly specified by the superword load instruction. A 16-byte store instruction transfers a less-significant 8-byte word from an explicitly specified general-purpose register and a more-significant 8-byte word from the special-purpose register. The invention also provides for more complex instructions that involve superword transfers.

Another aspect of the invention provides instructions that call for superword transfers conditioned on the results of word-sized (or smaller) operations. For example, a 16-byte exchange (store and load) can be conditioned on an 8-byte compare. Such instructions can be useful in accelerating algorithms that use multiple processors to simultaneously read and update large data structures, like databases, by allowing them to avoid the traditional approach of blocking other processors' access to a memory region (with a smaller atomic operation) and then releasing the block after the read or update.

Since part of the superword transfer involves a special purpose register, an additional instruction, e.g., a move instruction, can be required to move the word between the special-purpose register and a second general-purpose register. However, as the move instruction does not involve a memory access, there is a significant improvement over a pair of load or store instructions that both involve memory accesses.

Relative to systems that use plural general-purpose registers for superword transfers, the present invention obviates the need for additional read or write ports to the general-register file. Since the general-register file must be tightly coupled with the processor execution unit (ALU, etc.), the chip area required for the additional ports is scarce. The location of the special-purpose register is not constrained in this way, so even though it requires dedicated read and write ports, the cost of implementing the additional ports is less. In some cases, a special purpose register may already be provided, in which case, there is no additional cost associated with it or additional register ports.

Advantageously, the special-purpose register can be located near a level-1 cache to take advantage of the associated wider data path, as opposed to the word-size data paths near the general-register file. Furthermore, from an instruction set and processor point of view the larger operations are very similar to the word size operations, involving similar instruction encoding, faulting behavior, etc. Thus, the novel instructions are easily integrated with existing instruction sets. These and other features and advantages of the invention are apparent from the description below with reference to the following drawings.

DETAILED DESCRIPTION

Figure 1:
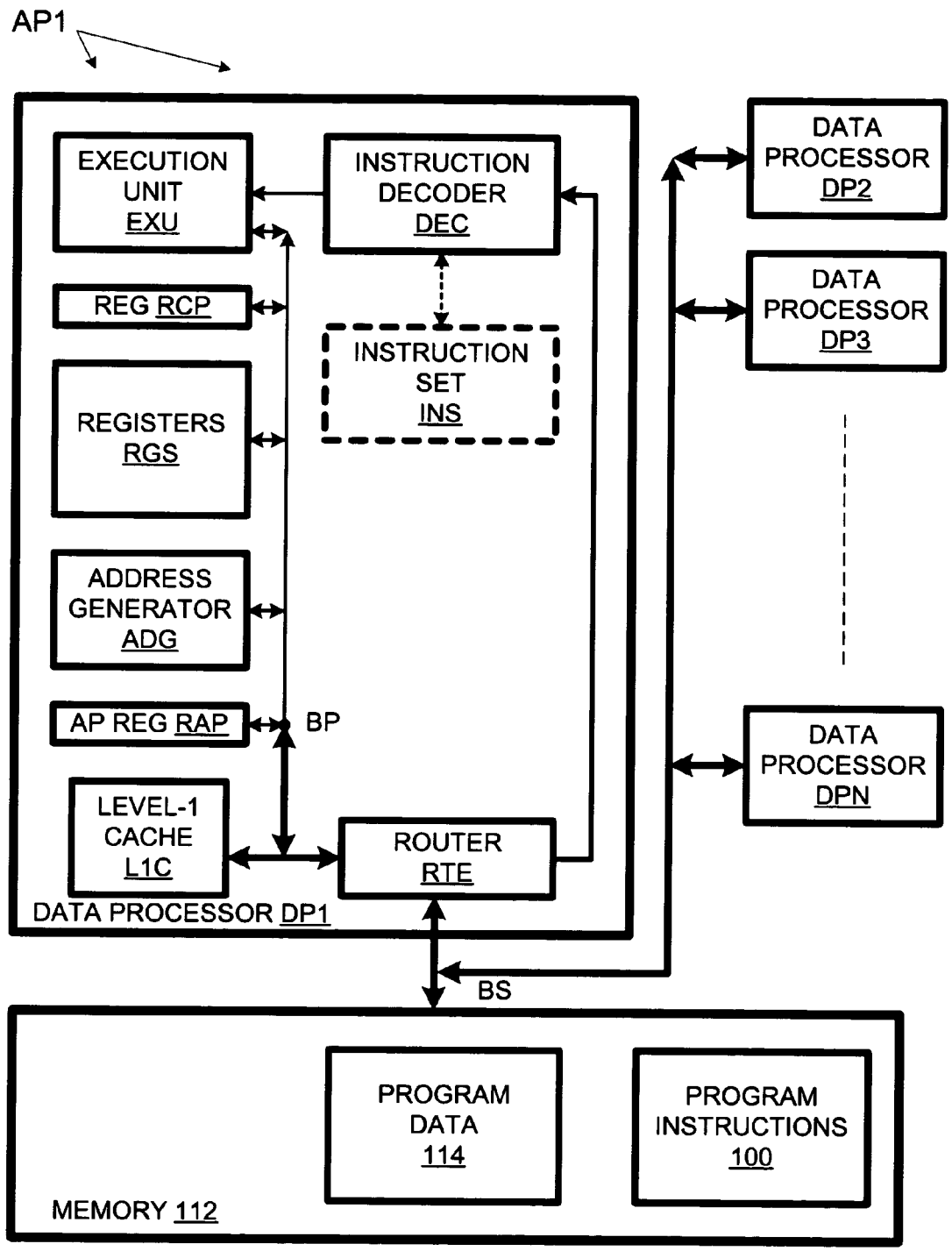
FIG. 1 is a schematic diagram of a computer system having data processors in accordance with the present invention.

A symmetric multiprocessing computer system AP1 comprises 64-bit "explicitly parallel instruction computing" (EPIC) data processors DP1-DPN and memory, which stores data and instructions. Data processor DP1 includes an execution unit EXU, an instruction decoder DEC with an associated instruction set INS, a general-register file RGF, an address generator ADG, a level-1 cache L1C, and a router RTE. In accordance with the invention, processor DP1 includes application registers including an application register RAP (corresponding to ar.csd in the Intel Itanium architecture) and a dedicated comparison register RCP (corresponding to ar.ccv in the Intel Itanium architecture). All registers of data processor DP1 are 64 bits. Processor DP1 has a data bus DB, which is 64 bits wide except near level-1 cache L1C where it is 128 bits wide. Data processors DP2-DPN, where N can be 64, are similar in design to data processor DP1.

The common instruction set INS for all processors DP1-DPN includes a 16-byte load, ld16, and a 16-byte store, st16. The ld16 instruction fetches 16 bytes from cache L1C. In the event of a cache miss, the requested data is fetched through cache L1C from main memory 112 (or a lower-level cache). The upper eight bytes are transferred to an explicitly specified general register of file RGS in a fashion similar to an 8-byte load, ld8, while the lower eight bytes are transferred to application register RAP. The ld16 instruction is typically followed by a move instruction that moves the contents of application register RAP to a specified general-purpose register of file RGS. Processor DP1 employs explicit parallelism, allowing the move instruction to be scheduled later with minimal impact.

A 16-byte store instruction, "st16", works in a complementary fashion. It is typically preceded by a move instruction that moves the least-significant eight bytes of a 16-byte phrase from a general-purpose register to application register RAP. The st16 instruction then transfers the contents of an explicitly specified general-purpose register and application register RAP as a 16-byte unit to level-1 cache L1C.

With the 16-byte store instruction, a writing processor, e.g., processor DP1, can modify a 16-byte instruction bundle atomically. Thus, preventing another processor, e.g., processor DP2, that might be executing the instructions from executing a combination of old and new bytes in a bundle. With only 8-byte atomic stores, there must be some more elaborate mechanism to coordinate the update (by somehow forcing the suspension of the executing process during the update, or by having the two programs somehow coordinate with each other.) Such mechanisms place much more complicated requirements on the two programs and may depend on an inherent cooperation between the two programs that may not exist. A single, larger, atomic store is self-contained, simpler to understand, and removes any dependence on cooperation.

A 16-byte exchange instruction, xch16, combines the store and load instructions. Typically, a preliminary move instruction would set up application register RAP. Then the exchange instruction reads a 16-byte quantity from level-1 cache L1C at the specified address, then writes the contents of an explicitly specified general-purpose register and the application register RAP to level-1 cache L1C at the specified address, then places the data that was read from the L1C into an explicitly specified general-purpose register and the application register RAP. In other words, the 16 bytes of registers and 16 bytes of memory are read, being held in some temporary storage (e.g., data paths), then the two 16-byte values are written—the registers get the value that was in memory, the memory gets the value that was in the registers. This may be followed by a Move instruction to transfer the word in application register RAP to a general-purpose register.

Also provided is a compare and exchange semaphore instruction cmp8xchg16. Preliminary move instructions can be used to move values into compare register RCP and application register RAP. Eight bytes are read from memory at an explicitly-specified memory address; these are placed in an explicitly-specified target general-purpose register. These bytes are compared with those in the comparison register RCP. If the values are equal, then 16 bytes are stored in memory: 8 bytes from the explicitly-specified source general-purpose register are stored at the address formed by masking bit 3 of the specified address to zero; and 8 bytes from application register RAP are stored at the address formed by masking bit 3 of the specified address to 1. The instruction is atomic in that the read, compare, and store operations are performed collectively as a single memory operation so that no other memory operations can occur in the middle.

The address must be 8-(not 16-) byte aligned. However, bit 3 of the address is ignored for the store portion, causing the store address to be 16-byte aligned. For example, if the instruction specifies an address 0x0, the bytes that are read and compared are from memory addresses 0x0 . . . 0x7, and the bytes that are stored are at addresses 0x0 . . . 0xF. If the instruction specifies an address 0x8, the bytes read and compared come from memory addresses 0x8 . . . 0xF, and the bytes stored are again at addresses 0x0 . . . 0xF. Since this comparison is done on 8 bytes of data, this leverages completely an existing data path in the Itanium 2 processor for a cmpxchg8 instruction in which 8 bytes are compared and exchanged.

The cmp8xchg16 instruction can accelerate algorithms that use multiple processors to simultaneously read and update larger data structures, like databases, by allowing them to avoid the traditional approach of acquiring a spinlock (with a smaller atomic operation) and then releasing it after the update. Instead, each object can be referenced by a pair of 8-byte values, a version number and a pointer to the object. Reading an object does not require a lock. To write an object, a snapshot of the version number and pointer (with a 16-byte atomic load) is taken. Then the object pointed to is copied and modified. The version number is then incremented. Finally, the new version is "posted" by executing a cmp8xchg16 instruction. The compare checks the version number.

If no other processor has updated the same object in the interim, the comparison succeeds. In that case, the version number and the pointer to the new revision of the object are updated atomically. If there is a collision, and the comparison fails, then the modification can be retried by repeating the above sequence, starting with taking a new snapshot of version and pointer, recopying, etc.). This allows for a more scalable database without requiring locks, (which can be performance bottlenecks) for reading or writing.

While the general-purpose registers are necessarily located near the execution unit for performance reasons, there is no such restriction on the application register RAP or RCP. Instead it is located near the level-1 cache. Near the execution unit, where chip "real estate" is at a premium, data paths are restricted to 8 bytes. At the level-1 cache, where chip real estate is less scarce, there is room for a larger data path, in this case 16 bytes. This makes it easy to gate values transferred to or from the application register onto the cache-data path. With the alignment restrictions, and availability of at least a 16-byte data path to the level-1 cache, hardware need only turn on the cache write enables for the extra 8 bytes of data.

The invention provides for a single word-sized special purpose register. Alternatively, the special-purpose register can be a different size than the general-purpose registers. Also, there can be multiple special purpose registers so that larger than word-size values can be stored in special-purpose registers. Also, the multiple special-purpose registers can be used to allow multiple superword transfers without intermediate move instructions—in such a case, for example, the special-purpose registers can be used in a round-robin fashion.

Thus, while the present invention has been described in the context of double eight-byte words, other word sizes are provided for. Also, the relation between the superword and the word can vary. Of course, as long as the ratio is equal to or below 2:1, an application register the same size as a general-purpose register can be used to permit the superword transfers. For greater ratios, a larger application register can be used or plural application registers can be ganged. For example, for a quadruple word transfer, an application register three times the size of the general-purpose registers can be used or a set of three application registers each having the same size as the general purpose registers can be used.

The present invention contemplates a modification to the Intel Itanium architecture, which is an "explicitly parallel instruction computing" (EPIC) architecture. However, the invention can also apply to "reduced instruction set computing" (RISC), "complex instruction set computing (CISC), "very long instruction word" (VLW) and other computing architectures as well. While in the illustrated embodiment, the explicitly specified general registers are specified directly (by values that corresponds to the registers), the invention also provides for indirect explicit specification. In the latter case, an instruction can point to a general- or special-purpose register that holds the value corresponding to the general-purpose register that is to be the source of a store or the destination of a load.

The present invention provides for atomic double-word and other superword loads and stores, as well as more complex operation sequences that include superword loads and stores, such as exchanges. These and other variations upon and modifications to the described embodiments are provided for by the present invention, the scope of which is defined by the following claims.

What is claimed is:

1. A data processor comprising:
   registers including first, second, and third registers, said first and second registers being general-purpose registers and sharing read and write ports, said third register being a non-general-purpose register having dedicated read and write ports; and
   an execution unit for executing
      a first instruction so as to transfer more data than can fit into said first register collectively from external memory to said first and third registers, and
      a second instruction so as to transfer more data than can fit into said second register collectively from said second and third registers to external memory.

2. A data processor as recited in claim 1 wherein said execution unit provides further for executing a third instruction so as to exchange information between said third register and one of said first and second registers.

3. A data processor as recited in claim 1 wherein, when said execution unit executes said first instruction, it loads said data from said memory.

4. A data processor as recited in claim 1 wherein, when said execution unit executes said first instruction, it exchanges first data stored in said memory with second data stored in said first register and said third register conditioned on the result of a comparison of third data in said memory with fourth data stored in one of said registers.

5. A method of transferring data comprising:
   in the course of executing a first instruction, transferring more data than can fit into a first general-purpose register that shares read and write ports with a second general-purpose register from external memory to said first register and a third non-general-purpose register having dedicated read and write ports; and
   in the course of executing a second instruction, transferring more data than can fit into said second register from said second and third registers to said external memory.

6. A method as recited in claim 5 wherein said data can fit into said second and third registers combined and said second instruction is a store instruction.

7. A method as recited in claim 5 wherein said data can fit into said first and third registers combined and said first instruction is a load instruction.

8. A method as recited in claim 5 wherein said first register is word-sized and said first instruction calls for a word-sized compare and then a double-word exchange conditioned on the outcome of said compare.

9. A method as recited in claim 5 wherein said first instruction specifies said first register explicitly and said third register implicitly.

10. Computer-readable memory media comprising a computer program including
- a first instruction to determine whether a condition is met by performing an operation on one or more operands each of which can fit within a general-purpose first register, and, if said condition is met, to perform a transfer of more data than can fit within said first register between memory and plural registers including said first register and a non-general-purpose second register having dedicated read and write ports; and
- a second instruction to determine whether a condition is met by performing an operation on one or more operands each of which can fit within a general-purpose third register, and, if said condition is met, to perform a transfer of more data than can fit within said third register between memory and plural registers including said second and third registers.

11. Computer-readable memory media as recited in claim 10 wherein said operation is a comparison and said program further includes a third instruction calling for exchanging data between said first and second registers.

12. A data processor comprising:
- registers, including first and second registers sharing at least one common read port and at least one common write port; and
- an execution unit for executing an instruction by performing a compare operation to determine if data stored in said first register matches data stored in external memory, and, if a match is found, transferring data that was compared in said compare operation and data that was not compared in said compare operation to external memory.

13. A data processor as recited in claim 12 wherein said registers include a non-general-purpose third register having dedicated read and write ports, said transfer involving an exchange of values between memory and a combination of said first register and said third register.

* * * * *

UNITED STATES PATENT AND TRADEMARK OFFICE
CERTIFICATE OF CORRECTION

PATENT NO. : 7,680,990 B2
APPLICATION NO. : 10/449442
DATED : March 16, 2010
INVENTOR(S) : Donald C. Soltis, Jr. et al.

It is certified that error appears in the above-identified patent and that said Letters Patent is hereby corrected as shown below:

On the face page, in field (75), Inventors, in column 1, line 1, delete "Donald C. Soltis," and insert -- Donald C. Soltis JR., --, therefor.

On the face page, in field (75), Inventors, in column 1, line 5, delete "Amy Lynn O'Donnell," and insert -- Amy Lynn Santoni, --, therefor.

In column 3, line 54, delete "and memory ," and
insert -- and computer-readable media such as memory 112, --, therefor.

Signed and Sealed this

Seventeenth Day of August, 2010

David J. Kappos
*Director of the United States Patent and Trademark Office*